United States Patent [19]

Mosebach et al.

[11] Patent Number: 5,018,388
[45] Date of Patent: May 28, 1991

[54] PRESSURE SENSOR FOR INFUSION CONDUITS

[75] Inventors: Wolfgang Mosebach, Dagobertshausen; Rolf Heitmeier, Baunatal; Hans Gerlach, Marsberg; Dieter Rath, Melsungen, all of Fed. Rep. of Germany

[73] Assignee: B. Braun Melsungen AG, Melsungen, Fed. Rep. of Germany

[21] Appl. No.: 532,023

[22] Filed: Jun. 1, 1990

[30] Foreign Application Priority Data

Jun. 7, 1989 [DE] Fed. Rep. of Germany ....... 3918534

[51] Int. Cl.$^5$ ........................... G01L 7/04; G01L 9/10
[52] U.S. Cl. ..................................... 73/730; 73/119 A
[58] Field of Search ................... 73/730, 119 A, 731, 73/729, 728

[56] References Cited

U.S. PATENT DOCUMENTS 3,698,249 10/1972 Weaver ................................ 73/730

Primary Examiner—Donald O. Woodiel
Attorney, Agent, or Firm—Spensley Horn Jubas & Lubitz

[57] ABSTRACT

A pressure sensor for determining the pressure of a medium in an elastic hose section. A pressure member acts on a unilaterally fixed bar carrying an influencing member at its free end. This influencing member is a core of a coil arrangement, the position of the core changing the frequencies of the oscillator coils. Numerous pressure values are received at regular intervals and, subsequently, a representative pressure value is obtained by averaging.

7 Claims, 2 Drawing Sheets

PRESSURE SENSOR FOR INFUSION CONDUITS

BACKGROUND OF THE INVENTION

1. Field of the Invention

The present invention relates to a pressure sensor, and more particularly to a pressure sensor for determining the pressure of a medium in a hose section of an infusion conduit.

2. Description of Related Art

From European Pat. 0 291 727, a pressure sensor for measuring the pressure of a one-way pump cartridge is known. This sensor is provided with a rod-shaped pressure member set against a membrane of the pump cartridge and held by a pair of leaf springs. With a high pressure acting on the membrane, the pressure member is pushed back against the resiliency of the leaf springs. One of the leaf springs has resistance strain gauges with which the deformation of this leaf spring may be measured to determine therefrom the pressure prevailing in the pump cartridge.

Generally, measuring pressures or forces with high accuracy by means of resistance strain gauges is rather complicated and troublesome. The resistance strain gauges require extremely careful mounting. Moreover, there is a danger that a long-time drift of the measuring signal may occur due to ageing of the joints.

Other known pressure sensors detect pressures by means of a capacitive measuring of forces. Due to the fact that the dielectric constant of the dielectric changes with time in dependence on the humidity of the air, temperature or contamination, these devices also have a rather limited long-time accuracy.

It is an object of the present invention to provide a pressure sensor that is of simple construction, yet which allows highly accurate pressure measurement, the accuracy of which may be maintained even during long-time use and under varying environmental conditions.

SUMMARY OF THE INVENTION

In accordance with the present invention, this and other objectives are achieved by providing a pressure sensor having a pressure member which acts on a bar that is fixed or supported at one end, like a single-armed lever. The bar resiliently presses the pressure member against the hose portion of an infusion conduit destined for the pressure measurement. At the outer, free end of the bar an influencing member is arranged which cooperates with at least one stationary oscillator coil.

The portions of the lever arm defined by the pressure member and the influencing member effect a gain corresponding to the relationship between the lengths of the portions of the lever arm. This means that the influencing member covers a comparatively long distance, while the change in dimension of the hose portion is comparatively small. Due to this gain, an inductive path gauge may be used to determine the changes in dimension of the hose portion with a very high accuracy. The inductive path gauge includes at least one oscillator coil in which an electric oscillation may be maintained. In correspondence to the proximity of the influencing member to the oscillator coil, the frequency, the amplitude or another parameter of the oscillation will change. Thus, the position of the influencing member can be detected contactlessly.

Preferably, the bar is a flexible spring that is fixedly clamped at one end. Instead of a flexible spring, one may also use a rigid bar on which a separate spring acts.

Preferably, the influencing member is a coil core; e.g., of ferrite material. Such a coil core does not require any electric terminals. However, a coil may be used as the influencing member; e.g., a short-circuit coil or a coil that may be connected to an external voltage source.

The evaluation of the pressure signals is preferably done by performing measurements of the position of the influencing member at regular time intervals. After a predetermined number of measurements, a representative pressure value may be determined by averaging the values obtained. This manner of evaluating the measured values provides a representative measurement result which is independent of the pressure changes over time in the hose section. This is also true in the case of a pulsating pressure in the hose, when the frequency of the pressure measurements or the sample frequency differs from the pressure frequency. In any case, with a sufficiently high number of measured values and a subsequent calculation of an average value, a representative pressure value will be obtained which indicates the average pressure in the hose section. This is also true if the pumping frequency changes.

The pressure sensor may be implemented, in particular, in combination with infusion pumps, into which the pressure sensor may be integrated. Infusion pumps are usually dimensioned such that they build up the necessary delivery pressure for supplying an infusion solution or a medicament. On the other hand, there also may be a need to limit the pressure. This is important for keeping the bolus volume low and for detecting a possible occlusion of the infusion conduit in time, so that no interruption of the medicament supply to the patient will occur.

Preferably, the sensor is provided such that the representative pressure value must lie below a selectable upper limit and above a selectable lower limit. Should the representative pressure value lie outside this range, an alarm will be generated. If the representative pressure value lies below the lower limit, leakages in the infusion conduits and an unobstructed free flow of the infusion liquid may be detected.

BRIEF DESCRIPTION OF THE DRAWINGS

A detailed description of a preferred embodiment of the invention will be made with reference to the accompanying drawings.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
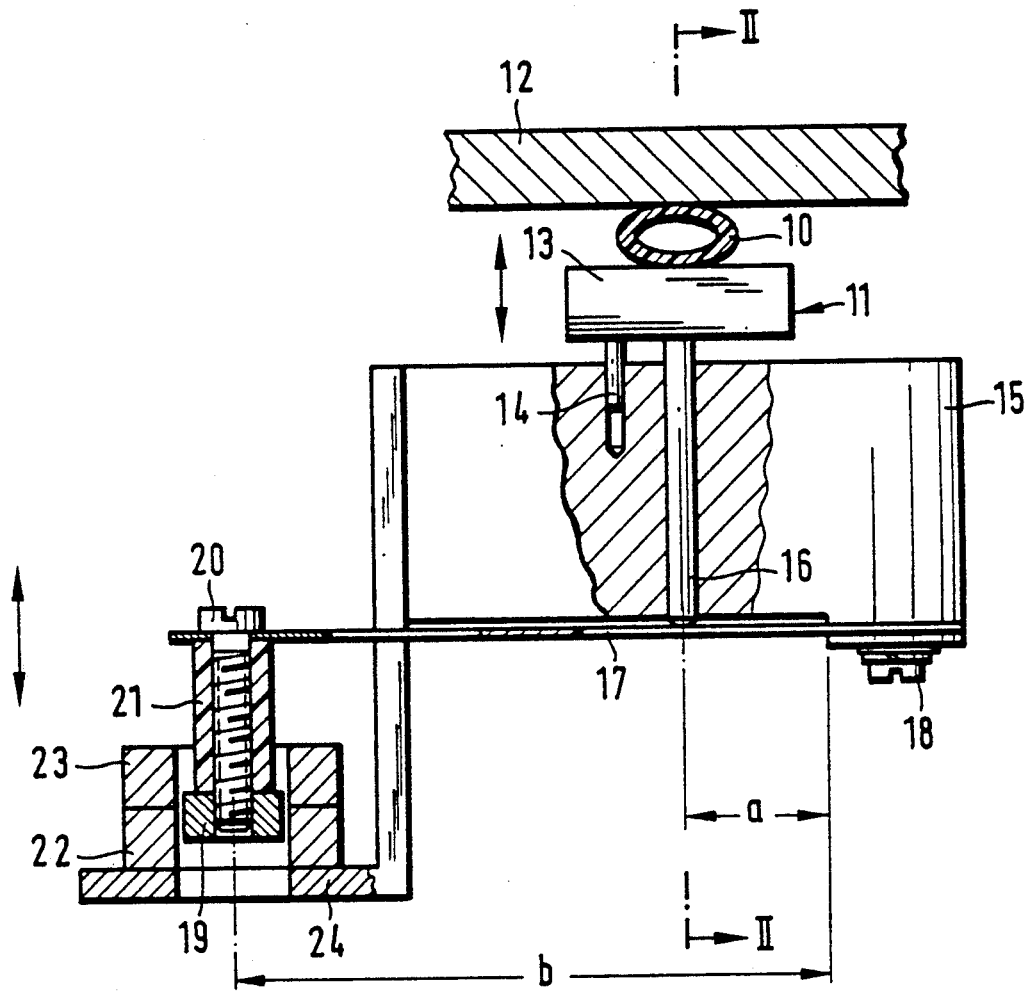
FIG. 1 shows a schematic illustration of a pressure sensor in partial section.

As illustrated in FIG. 1, the pressure sensor has an elastic hose section 10 inserted in an infusion conduit, which, for example, may consist of silicone material.

This hose section 10 may also be a part of the infusion conduit.

The hose section 10 is pressed against an abutment 12 (for example, a housing cover) by a pressure member 11. The pressure member 11 has a pressure piece 13 which extends transversely to the hose section 10 and which presses the hose section 10 against the abutment 12 with its rounded upper back portion.

The pressure piece 13 may be guided in a carrier block 15 by means of guide pins 14 and is movable in the radial direction of the hose section 10. A ram 16 projects from the pressure piece 13. The ram 16 also extends through a passage of the carrier block 15 and presses against a bar 17.

The bar 17 may be provided in the form of a flexible spring mounted on the underside of the carrier block 15 facing away from the hose section 10. The bar 17 may be fixedly mounted to the carrier block 15 at one of its ends by means of a screw 18.

The ram 16 engages the bar 17 at a distance a from the point of fixation. At the free end of the bar 17, the influencing member 19 is fixed at a distance b from the point of fixation. The distance b is at least twice the distance a, and is preferably at least three times the distance a. The bar 17 forms a single-arm lever with the leverage b:a, which causes an extension of the path of the ram 16 by at least a factor of two.

The influencing member 19 may be an annular coil core (e.g., of ferrite material) mounted at the end of the bar 17 by means of a screw 20. A spacer 21 (e.g., of plastic material) surrounding the screw 20 may be disposed between the bar 17 and the influencing member 19.

The influencing member 19 is located in a space which is enclosed by two oscillator coils 22 and 23. Both of the oscillator coils 22 and 23 are successively arranged and mounted on a carrier 24 fixed to the carrier block 15. The direction of movement of the influencing member 19 extends substantially parallel to the direction of movement of the ram 16.

Figure 3:
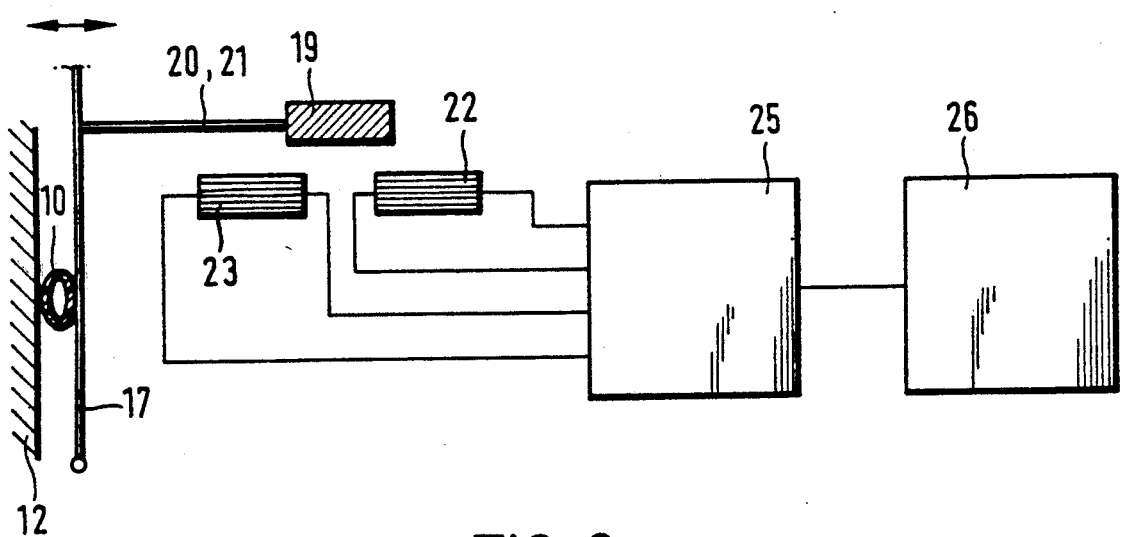
FIG. 3 shows a schematic illustration of the generation and evaluation of the signals.

As shown in FIG. 3, the two oscillator coils 22 and 23 are connected to an oscillation generating circuit 25. In combination with the oscillation generator 25, the oscillator coils 22 and 23 form RL resonators, the frequency of which depends upon the magnitude of the inductivity. The magnitude of the inductivity changes in dependence upon the distance of the influencing member 19 from the respective coil.

If the influencing member 19 is exactly in the middle between both of the oscillator coils 22 and 23, then the oscillator coils will oscillate at the same frequency. A displacement of the influencing member 19 will cause an increase in the frequency of one of the oscillator coils, while the frequency of the other oscillator coil will decrease. The ratio between the oscillation frequencies results in a signal which may be evaluated for the determination of the position of the influencing member 19 and thus for the determination of the pressure in the hose section 10. The evaluation of the signal may be performed in a computer 26.

During the evaluation, the forces or the pressures exerted by the hose section 10 on the pressure member 11 are determined from the measured positions of the influencing member 19 in consideration of the spring constant of the bar 17. The evaluation may be performed by a sampling method with a predetermined sampling frequency. The pressure signal is received at each measuring time. The successively received pressure signals are added in the computer 26. After a predetermined number of pressure signals, an arithmetic mean (indicating a representative pressure value) may be generated based upon the sum of the added pressure signals. This representative pressure value may be compared to an upper and a lower threshold value. These threshold values may be changed by the user. An alarm or an interruption of the operation of the infusion conduit may be caused if the representative pressure value lies outside the allowable range, or if the representative pressure value lies outside the allowable range for a certain minimum time.

Figure 2:
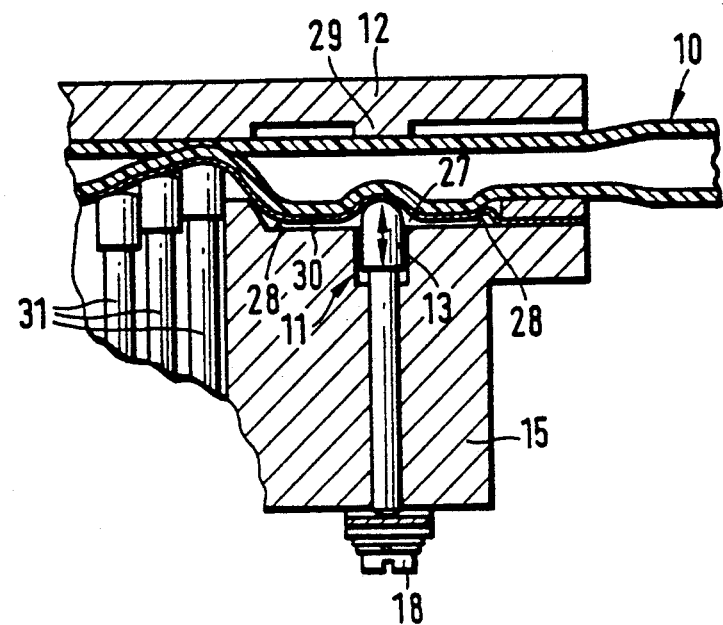
FIG. 2 shows a section along line II—II in FIG. 1.

As illustrated in FIG. 2, the pressure member 11 is preferably situated in the central part of the length of a pressure measuring chamber 27 through which the hose section 10 extends. In the direction of the extension of the hose, supporting surfaces 28 are provided before and behind the pressure member 11, from which the pressure piece 13 projects towards the hose section 10. Opposite the pressure piece 13, a projecting supporting surface 29 is affixed to the abutment 12.

A membrane 30 extends through the pressure measuring chamber 27. This membrane covers the supporting surfaces 28. The periphery of the membrane may be clamped at the stationary parts of the pressure sensor, thereby preventing a direct contact between the hose section 10 and the pressure member 11. In case of a leak in the hose section 10, the essential parts of the sensor will thus not be contaminated.

In the illustrated embodiment, the pressure sensor is a part of a finger pump, wherein numerous linearly movable pressure fingers 31 continuously squeeze the hose section 10 in order to peristaltically transport the liquid within the hose section.

The presently disclosed embodiment is to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A pressure sensor for determining the pressure of a medium in a hose, comprising:
   a resilient bar having a free end and a fixed end,
   a pressure member for pressing the hose, the pressure member contacting the resilient bar at a point of contact nearer to the fixed end of the bar than the free end of the bar,
   an influencing member mounted adjacent the free end of the bar and defining a path, and
   means for determining the position of the influencing member, including at least two oscillator coils for maintaining an electric oscillation having a parameter which changes in response to changes in position of the influencing member, each of the oscillator coils maintaining an electric oscillation having a parameter which changes in response to changes in position of the influencing member, the two oscillator coils being successively arranged in the path of the influencing member.

2. The pressure sensor according to claim 1, wherein the bar comprises a flexible spring.

3. The pressure sensor according to claim 1, wherein each of the two oscillator coils maintains an electric oscillation having a frequency, and further comprising an evaluating means for determining the ratio of the frequencies of the two oscillator coils.

4. The pressure sensor according to claim 1, wherein the fixed end of the bar and the point of contact between the pressure member and the bar are spaced apart by a first distance, wherein the fixed end of the bar and the influencing member are space apart by a second distance, and wherein the second distance is equal to at least twice the first distance.

5. The pressure sensor according to claim 1, wherein the pressure member presses the hose with a resiliency which is sufficiently large to squeeze the hose when the hose is empty.

6. A pressure sensor for determining the pressure of a medium in a hose, comprising:
   a resilient bar having a free end and a fixed end,
   a pressure member for pressing the hose, the pressure member contacting the resilient bar at a point of contact nearer to the fixed end of the bar than the free end of the bar,
   an influencing member mounted adjacent the free end of the bar,
   means for determining the position of the influencing member, including an oscillator coil for maintaining an electric oscillation having a parameter which changes in response to changes in position of the influencing member,
   a housing for accommodating the hose, and
   a membrane for separating the pressure member and the hose.

7. A method for determining the pressure of a medium in a hose, comprising the steps of:
   providing a resilient bar having a free end and a fixed end,
   pressing the hose with a pressure member,
   establishing a point of contact between the pressure member and the resilient bar, the point of contact being nearer to the fixed end of the bar than the free end of the bar,
   mounting an influencing member adjacent the free end of the bar, whereby the pressure of the medium in the hose affects the position of the influencing member,
   providing an oscillator coil for maintaining an electric oscillation having a parameter which changes in response to changes in the position of the influencing member,
   measuring the parameter which changes in response to changes in the position of the influencing member,
   calculating the pressure of the medium in the hose based upon the measured parameter,
   performing the step of measuring the parameter which changes in response to changes in the position of the influencing member a predetermined number of times at uniform time intervals, and
   calculating a representative pressure value based upon an average of the measured parameters.

* * * * *